(No Model.)
I. B. BEARD.
CULTIVATOR.
No. 264,060. Patented Sept. 12, 1882.
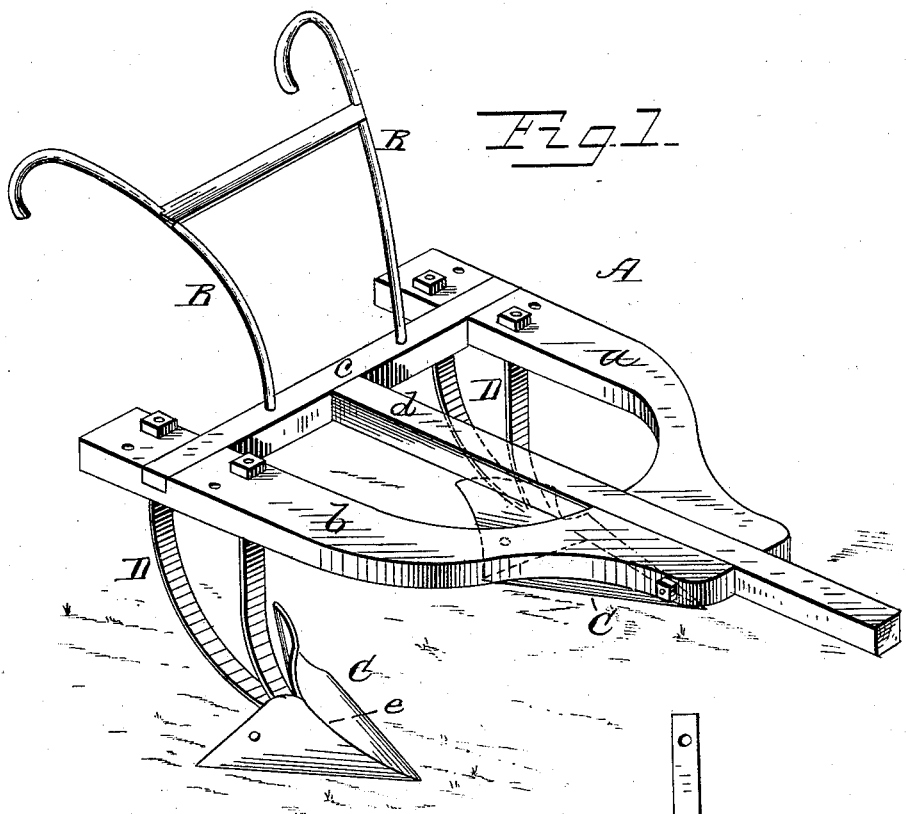
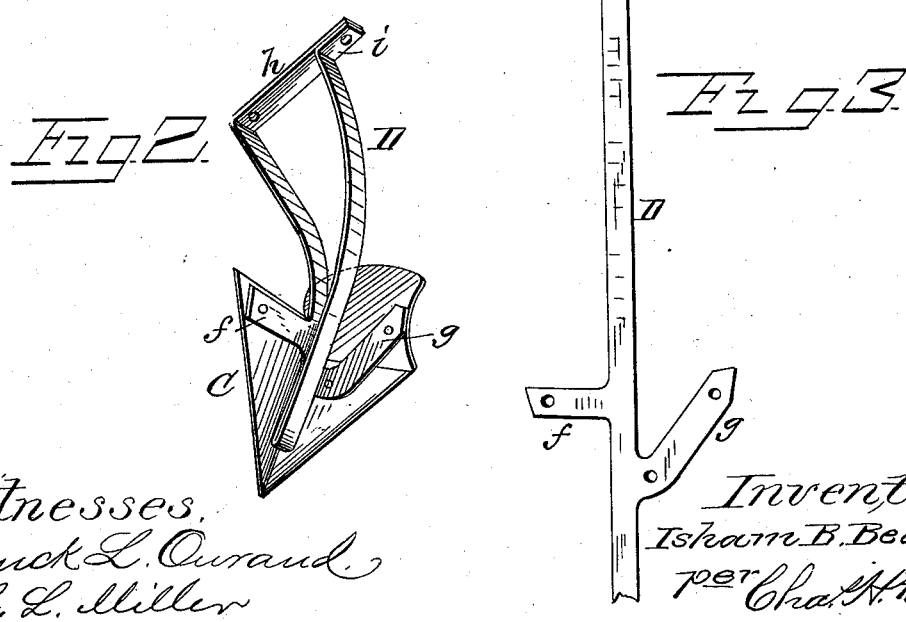
Witnesses.
Franck L. Ouraud
L. L. Miller
Inventor:
Isham B. Beard
per Chas. H. Fowler
Attorney

UNITED STATES PATENT OFFICE.

ISHAM B. BEARD, OF VILLA VISTA, LOUISIANA.

CULTIVATOR.

SPECIFICATION forming part of Letters Patent No. 264,060, dated September 12, 1882.

Application filed May 16, 1882. (No model.)

*To all whom it may concern:*

Be it known that I, ISHAM B. BEARD, a citizen of the United States, residing at Villa Vista, in the parish of East Carroll and State of Louisiana, have invented certain new and useful Improvements in Cultivators; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an under side perspective view of one of the plows, showing the standard connected thereto; and Fig. 3 is a detail view of the standard previous to its being bent into shape.

The present invention has relation to certain new and useful improvements in that class of agricultural implements used for the cultivation of corn or cotton; and it consists in the details of construction substantially as shown in the drawings, hereinafter described, and claimed.

In the accompanying drawings, A represents the frame of the cultivator, provided with the usual handles, B, connected to the cross-brace of the frame. This frame A is composed of four pieces, connected together in the following manner: The two side pieces, $a\, b$, are of angular form, or of such shape as to very nearly come together at their forward ends, while their rear ends are of such distance apart as to give the required width to the frame, and are held in such position by a brace, $c$, mortised at its ends into the upper surface of the side pieces.

To the side of the brace $c$ is mortised one end of a beam, $d$, which extends centrally beyond the forward ends of the side pieces a sufficient distance to serve as a tongue for hitching the team to.

The forward ends of the side pieces, $a\, b$, are securely bolted to the central beam, $d$, thereby enabling the four sections composing the frame to be readily taken apart or put together for packing and transportation, or enabling any one of the sections to be replaced by a new one in case it should become broken.

The plows C are each provided with a mold-board—one right and the other left—so that when it is desired to throw a large hill to the corn or cotton the plows are reversed so as to make the mold-board next the cotton or corn. The plows are made with a sharp central edge, $e$, in front, which, in connection with the mold-board, will enable the plow to throw the soil in both directions.

The plows C have securely bolted to their under side peculiarly-formed standards, which are constructed in the following manner: The standards are each composed of a heavy bar of iron, (represented at D,) said bar being of sufficient length to bend into the form as shown in Fig. 2. The bar D has a right-angle extension brace or arm, $f$, and diagonally opposite an arm, $g$, at an acute angle to the length of said bar, as more fully shown in Fig. 3, the arm $g$ being properly bent to conform to the interior curve of the plow, so that it will lie snugly against the surface. That portion of the bar D that forms the lower end of the standard is bent down closely upon itself, and as the ends of the bar approach the cultivator-frame they are bent outward to increase the distance between them, to increase the strength and rigidity of the standard. The bar D, at its upper ends, is bent at right angles, or horizontally, to form flanges $h\, i$, which lap each other and enable the standards to be connected by suitable bolts and nuts to the under side of the frame A, while the lower end of the standard is secured to the plow by the arms $f\, g$.

A standard of the form shown possesses strength and rigidity, can be readily secured to the plow, and conveniently changed from one side of the frame A to the other, additional holes being made in the side pieces, $b$, for the bolts, to enable the distance between the plows to be increased or diminished as circumstances require.

Having now fully described my invention, what I claim as new, and desire to secure by Letters Patent, is—

The combination, with the frame A and plows C, of the standards, consisting of the metal bar D, having upon one side right-angle arm $f$ and diagonally opposite the arm $g$ at an acute angle to the length of the bar, the latter being bent, as shown, and at its upper ends having horizontal flanges $h\, i$, substantially as and for the purpose described.

In testimony that I claim the above I have hereunto subscribed my name in the presence of two witnesses.

ISHAM BROWDER BEARD.

Witnesses:
JOSEPH SIDNEY GUENARD,
JAMES OLIVER WILCOX.